United States Patent
Hughes et al.

[11] 4,047,795
[45] Sept. 13, 1977

[54] OPTICAL INTEGRATED CIRCUIT LASER BEAM SCANNER

[75] Inventors: Richard Swart Hughes, China Lake; Howard A. Wilcox, Santa Barbara, both of Calif.

[73] Assignee: The United States of America as represented by the Secretary of the Navy, Washington, D.C.

[21] Appl. No.: 526,299

[22] Filed: Nov. 22, 1974

[51] Int. Cl.$^2$ ............................ G02B 5/14; G02F 1/29
[52] U.S. Cl. ............................... 350/96 C; 350/160 R
[58] Field of Search ............ 350/96 C, 96 WG, 160 R

[56] References Cited

U.S. PATENT DOCUMENTS 3,904,270  9/1975  Cheo .............................. 350/96 WG

OTHER PUBLICATIONS

"Electronic Design," Apr. 1972, p. 30.

*Primary Examiner*—Rudolph V. Rolinec
*Assistant Examiner*—Darwin R. Hostetter
*Attorney, Agent, or Firm*—R. S. Sciascia; Roy Miller; Thomas W. Hennen

[57] ABSTRACT

A rapid laser scanning system utilizing an optical grating coupler (OGC) whereby the angle at which an incident laser beam is outputted therefrom may be varied by the imposition of an electric field on a thin film underlying the coupler at right angles to the path of the laser beam through the thin film.

17 Claims, 1 Drawing Figure

OPTICAL INTEGRATED CIRCUIT LASER BEAM SCANNER

BACKGROUND OF THE INVENTION

1. Field of the Invention

The invention is concerned with causing a laser beam to be scanned rapidly without the use of any moving mechanical parts.

2. Description of the Prior Art

Prior art techniques utilizing rotating mirrors having a relatively large mass have been used. However, the attendant disadvantage of moving the relatively large mass of the mirrors precludes rapid scanning.

SUMMARY OF THE INVENTION

The system comprises a laser of any well known type for providing an output beam which is coupled to an optical integrated circuit comprising an input optical grating, an output optical grating and an optical path therebetween. The basic building block for integrated optical circuitry is a thin film light guide wherein the film is generally of a thickness approximating the wavelength of the light to be transmitted. The thin film is formed of a material wherein the index of refraction may be varied by imposing an electric field at right angles to the path of the laser beam through the thin film.

BRIEF DESCRIPTION OF THE DRAWING

The single FIGURE illustrates the invention with emphasis on the optical integrated circuit.

DESCRIPTION OF THE PREFERRED EMBODIMENT

Figure 1:
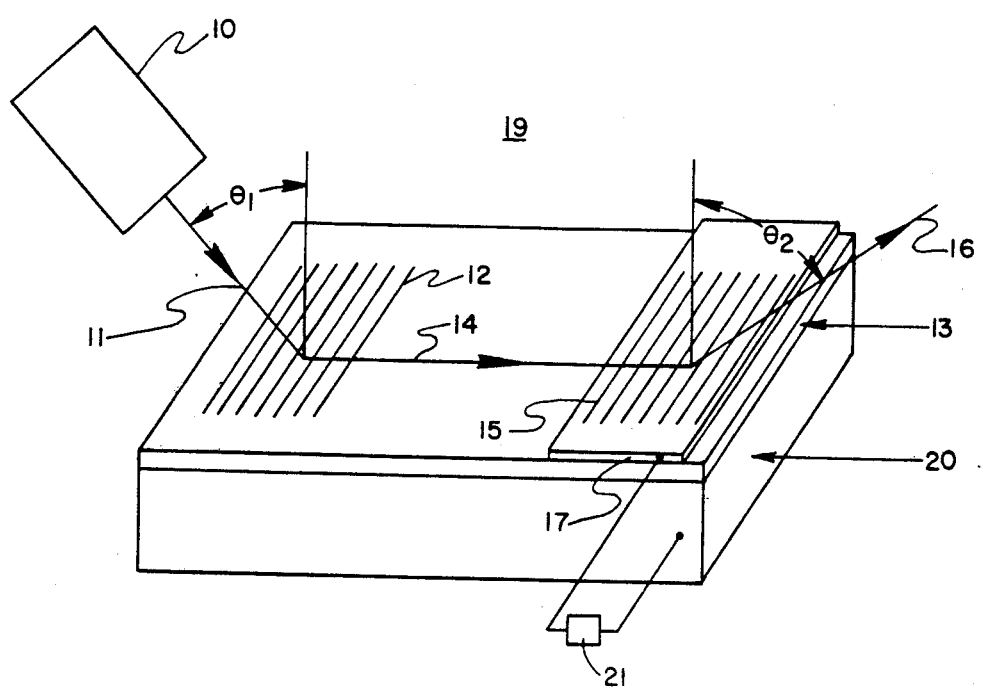

With respect to the FIGURE, the illustrated embodiment of this invention comprises a laser, indicated at 10, which may be any one of several such as a dye laser, CW He Ne laser, etc. which produces an output beam 11. The output beam 11 is incident on an input optical grating 12 and coupled through an electrically insulating thin film 13 as illustrated by path 14. The path 14 terminates at output optical grating 15 and the output beam is shown at 16.

A very thin electrically conductive and optically transparent electrode 17, which is of the appropriate refractive index is deposited on the guiding film, 13. The electrode, 17, is positioned below the output optical grating, 15, and an electric field can be established between this electrode and the electrically conductive substrate, 20. Coupled to the electrode and the substrate is a signal source 21 so that a high electric field may be established across that portion of the thin film over which output grating 15 is deposited to change the refractive index of the thin film 13. The optical grating couplers 12 and 15 can be produced upon the surface of the thin film 13 using either photoresist or holgraphic techniques as is well known in the art.

The optical integrated circuit 19 consists of a substrate 20, thin film 13 and grating couplers 12 and 15. Such a configuration is described elsewhere as for instance in Dakss, M. L., Kuhn, L., Heidrich, P. F., and Scott, B. A., "Grating Coupler For Efficient Excitation Of Optical Guided Waves In Thin Films", *Applied Physics Letters*, 16, No. 12 (June 1970), pp. 523-525, or in Kogelnik, H., and Sosnowski, T. P., "Holographic Thin Film Couplers", *The Bell System Technical Journal*, (September 1970), pp. 1602-1608. The condition that exists in the present invention with respect to the optical integrated circuit is that the thin film 13 is formed of a material which exhibits the electro-optic effect such as zinc oxide, lithium tantalate, lithium niobate, etc., and means are provided whereby an electric field can be established in the film 13.

Details of optical integrated circuits have been presented elsewhere, such as in the two cited references, and only those aspects of the operation of the optical integrated circuit which are specific to the present invention will be described.

In operation, the input laser beam 11 is incident at an angle $\theta_1$ upon the input optical grating coupler 12. If the phase variations produced by the optical grating coupler 12 on the surface of the thin film match those of the guided wave 14, then the input beam is coupled into the thin film 13. The laser beam 14 is then propagated in the thin film 13 to the output optical grating coupler 15 where it is coupled out of the thin film at an angle $\theta_2$.

The polarization wave which is established by the input optical grating coupler 12 on the surface of the film 13 can be represented as a superposition of many waves with individual phase variations $$\exp\{i[m(2\pi/d)x + (2\pi/\lambda_o)(\sin\theta_{1,2})X]\} \quad (1)$$

where $m$ is any integer, $d$ is the OGC constant, $X$ is the displacement in the direction of the beam 14 in the film and $\theta_{1,2}$ is the input or output angle. The polarization wave as given by (1) will couple most strongly to a film guided wave of the form $$\exp\{i[2\pi/\lambda_2]X\} \quad (2)$$

where $\lambda_2 = v/c\,\lambda_o$ is the wavelength of the guided wave 14. Combining (1) and (2) gives $$\sin\theta_{1,2} = n_f - m\lambda_o/d. \quad (3)$$

Equation (3) shows that the input or output angle ($\theta_1$ or $\theta_2$) is a function of the refractive index of the thin film, $n_f$.

By applying an electric field to the thin film 13 by electrode 17 and substrate 20 under an optical grating coupler, change in the dielectric constant $\epsilon$ of the thin film can be produced. As the refractive index for non-magnetic materials is given by $n = \sqrt{\epsilon}$, the applied electric field causes changes in the refractive index and thus causes the output angle to vary.

The invention provides for an efficient means of rapidly scanning the output light beam 16 from an optical integrated circuit by means of an applied electric field. It also provides for a means of phase matching a variable wavelength input laser beam 11 without mechanical adjustment of the input angle $\theta_1$.

What is claimed is:

1. A variable optic coupler, comprising:
   an optical path formed of a material which responds to a high electric field by manifesting the electro-optic effect, for propagating a laser beam;
   means for coupling said laser beam into and out of said optical path at predetermined coupling angles, wherein said coupling means has at least one optical grating coupler overlying at least a portion of said optical path;
   means for electro-optically changing the refractive index of said portion of the optical path which underlies said optical grating coupler;

so arranged and constructed that the laser beam coupling angle at said optical grating coupler changes in response to changes in the refractive index of said portion of the optical path which underlies said optical grating coupler.

2. The variable optic coupler of claim 1 wherein said optical path comprises an electrically insulating thin film.

3. The variable optic coupler of claim 1 wherein said means for electro-optically changing the refractive index of said portion of the optical path which underlies said optical grating coupler comprises:
   an optically transparent transducer underlying said optical grating coupler;
   said transducer being operative to impress an electric field across said portion of the optical path which underlies said optical grating coupler.

4. The variable optic coupler of claim 1 wherein said optical path comprises zinc oxide.

5. The variable optic coupler of claim 1 wherein said optical path comprises lithium tantalate.

6. The variable optic coupler of claim 1 wherein said optical path comprises lithium niobate.

7. The variable optic coupler of claim 3 wherein signal means are operably connected to said transducer for causing an electric field to be impressed across said portion of the optical path which underlies said optical grating coupler in response to a signal.

8. The variable optic coupler of claim 3 wherein said transducer underlies an optical grating coupler which couples said laser beam into said optical path.

9. The variable optic coupler of claim 3 wherein said transducer underlies an optical grating coupler which couples said laser beam out of said optical path.

10. The variable optic coupler of claim 7 further comprising:
    an electrically conductive substrate underlying said thin film; and
    wherein said signal means are operably connected to said substrate and said transducer.

11. A variable optic coupler, comprising:
    an electrically conductive substrate;
    an electrically insulating thin film formed of a material which responds to a high electric field by manifesting the electro-optic effect, said thin film overlying said substrate and defining an optical path for propagating a laser beam;
    at least one optically transparent transducer overlying at least a portion of said thin film, said transducer being operative to impress a high electric field across said portion of said thin film;
    first and second optical grating couplers overlying said thin film and having predetermined laser beam coupling angles for coupling said laser beam into and out of said thin film at said predetermined coupling angles, and at least one of said grating couplers overlying said transducer;
    signal means operably connected to said transducer and said substrate for causing a high electric field to be impressed in said thin film in response to a signal;
    so arranged and constructed that the laser beam coupling angle at the optical grating coupler which overlies said transducer changes in response to changes in the refractive index of the portion of the thin film which underlies said transducer.

12. The variable optic coupler of claim 11 wherein said first optical grating coupler overlies said transducer for coupling said laser beam into said thin film.

13. The variable optic coupler of claim 11 wherein said second optical grating coupler overlies said transducer for coupling said laser beam out of said thin film.

14. The variable optic coupler of claim 11 wherein said first and second optical grating couplers each overlie a transducer.

15. The variable optic coupler of claim 11 further comprising:
    a laser medium for producing an output laser beam;
    an output laser beam produced by said laser medium;
    said laser beam being incident upon said first optical grating coupler at a predetermined coupling angle.

16. The variable optic coupler of claim 15 wherein said first optical grating coupler overlies said transducer, and the laser beam coupling angle at said first optical grating coupler changes in response to said signal, so that said laser beam will decouple from entering said thin film in response to said signal.

17. The variable optic coupler of claim 15 wherein said second optical grating coupler overlies said transducer and the laser beam coupling angle at said second optical grating coupler changes in response to said signal, so that the laser beam coupled out of the thin film by said second optical grating coupler scans as the coupling angle for said second optical grating coupler changes.

* * * * *